United States Patent [19]

Adair

[11] 4,088,278
[45] May 9, 1978

[54] REEL FOR MAGNETIC RECORDING TAPE
[75] Inventor: Henry Adair, Mission Viejo, Calif.
[73] Assignee: Memorex Corporation, Santa Clara, Calif.
[21] Appl. No.: 796,876
[22] Filed: May 16, 1977
[51] Int. Cl.² ............................................. B65H 75/18
[52] U.S. Cl. .................................................. 242/71.8
[58] Field of Search ............ 242/71.8 A, 118.9, 118.7, 242/118.8

[56] References Cited
U.S. PATENT DOCUMENTS

| | | | |
|---|---|---|---|
| 3,088,689 | 5/1963 | Perlini | 242/71.8 |
| 3,229,928 | 1/1966 | Burgess | 242/71.8 |
| 3,327,960 | 6/1967 | Hedin | 242/71.8 |
| 3,389,872 | 6/1968 | Lyman | 242/71.8 |
| 3,545,696 | 12/1970 | Berkey | 242/71.8 |
| 3,794,258 | 2/1974 | Posso | 242/71.8 |

Primary Examiner—Edward J. McCarthy
Attorney, Agent, or Firm—Limbach, Limbach & Sutton

[57] ABSTRACT

A reel for magnetic recording tape includes a hub having axially extending coaxial inner and outer rims joined by a radially extending web, and an intermediate ring on each side of the web extending axially outward of the web, and a pair of opposed flanges. The flanges are attached to and extend radially outward of the hub, and each flange has a pair of coaxial rings extending axially inward of the reel with the radially outer flange rings being received against the corresponding radially inward portion of the hub outer rim and the radially inner flange rings being received against the radially outward portion of the corresponding hub intermediate rings.

13 Claims, 10 Drawing Figures

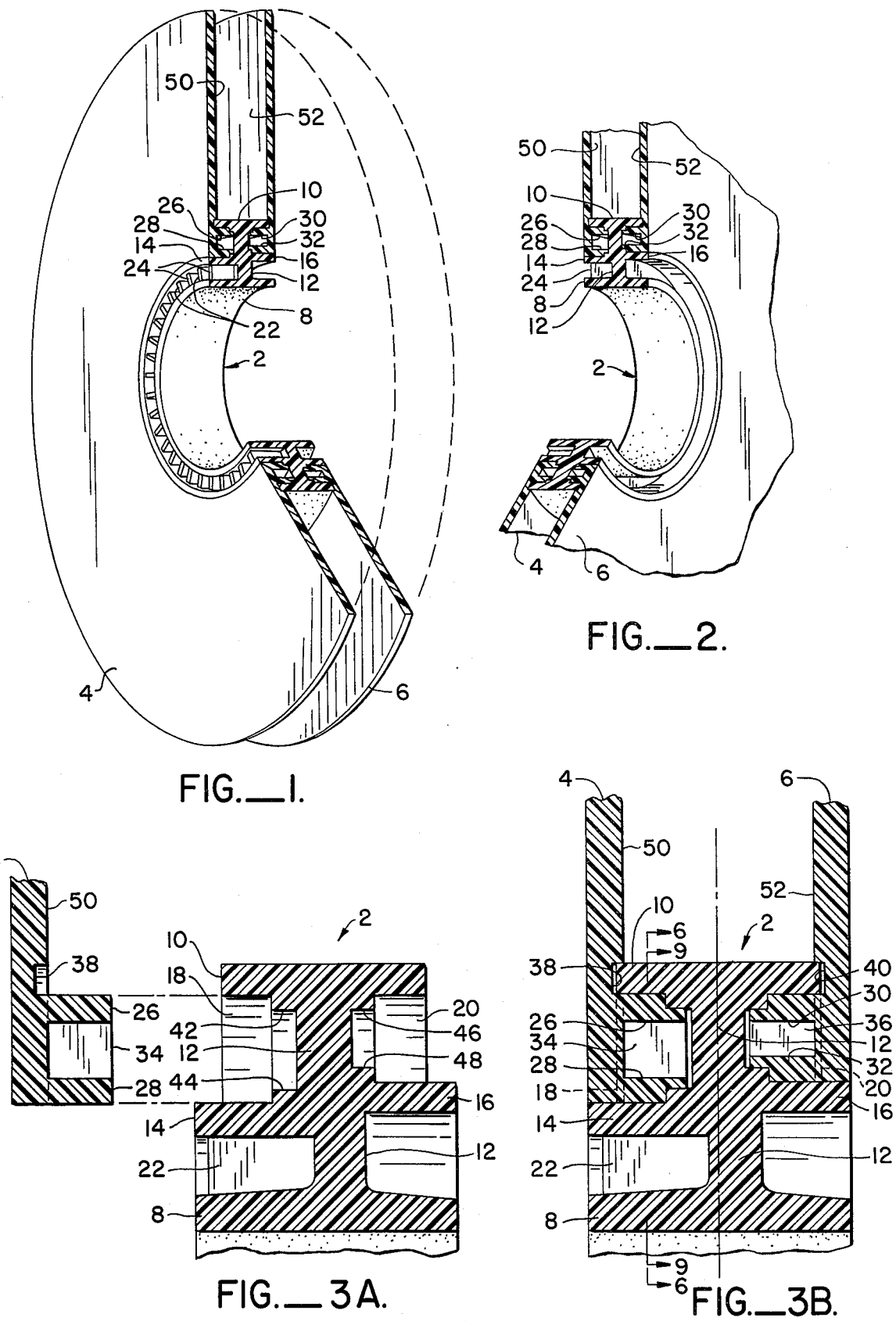
FIG.—1.
FIG.—2.
FIG.—3A.
FIG.—3B.

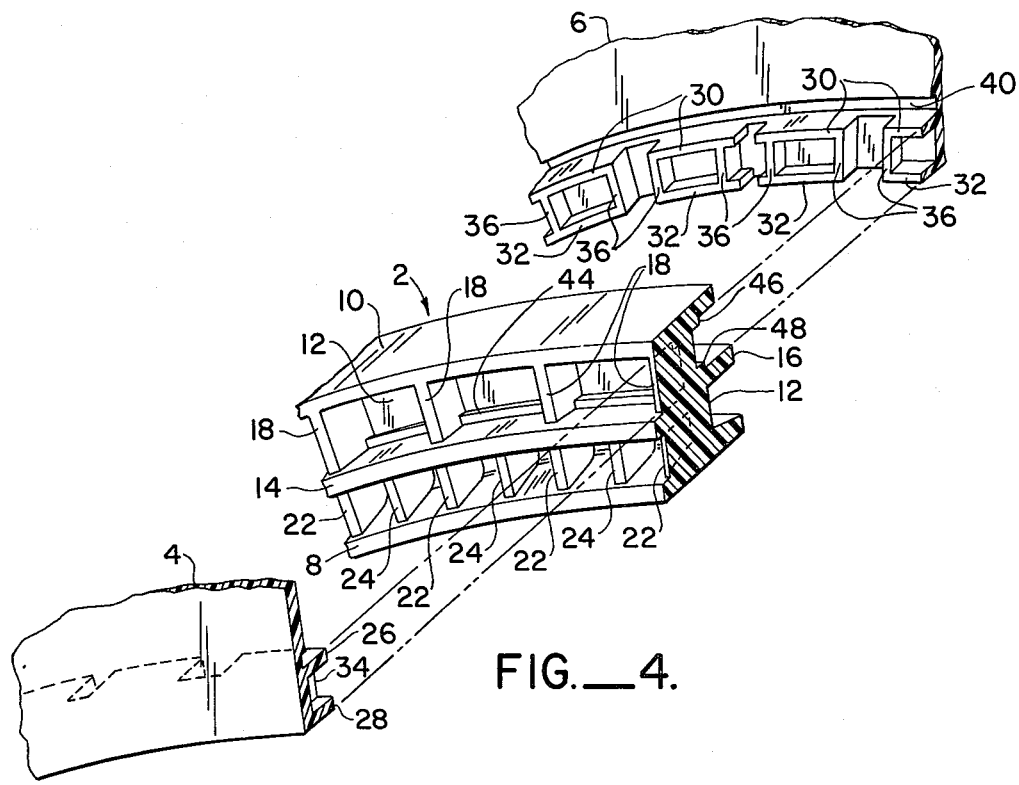
FIG._4.
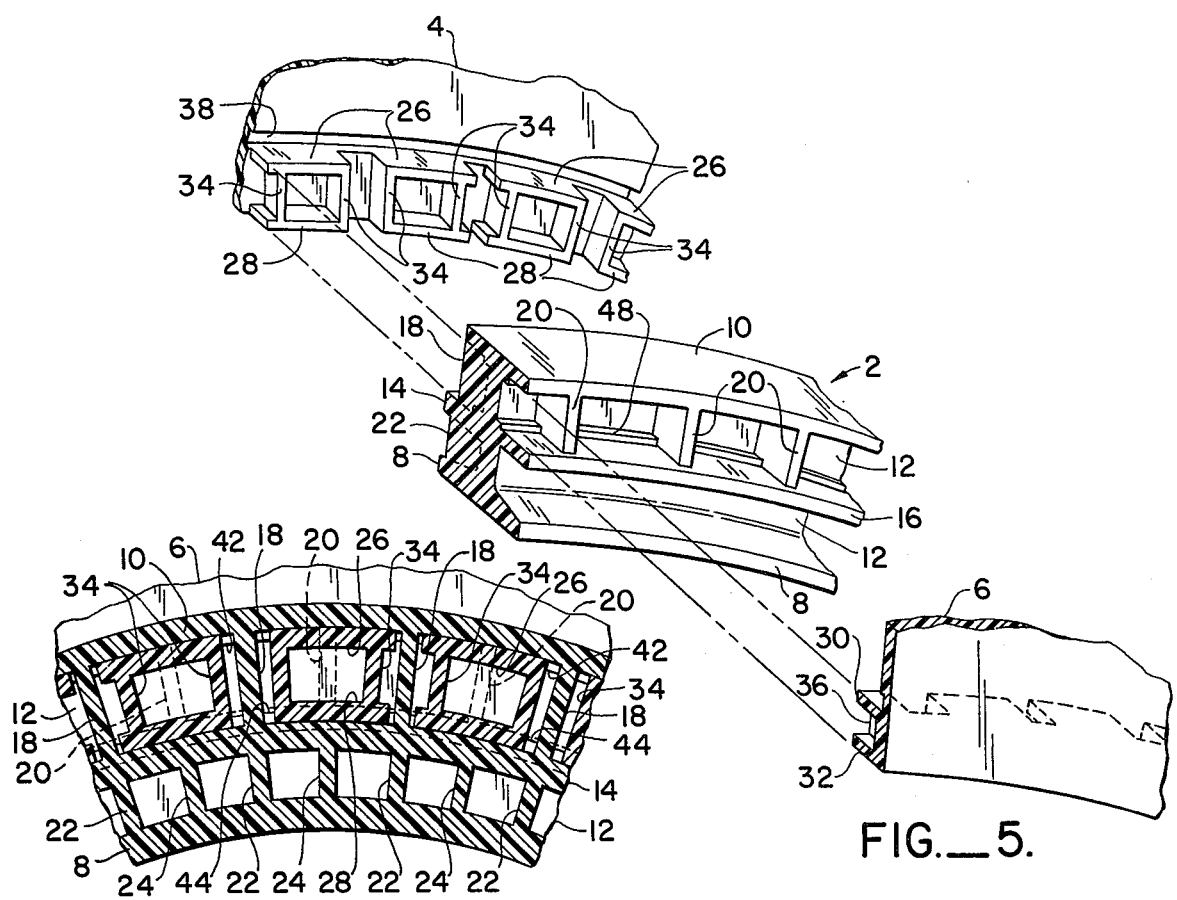
FIG._6.
FIG._5.

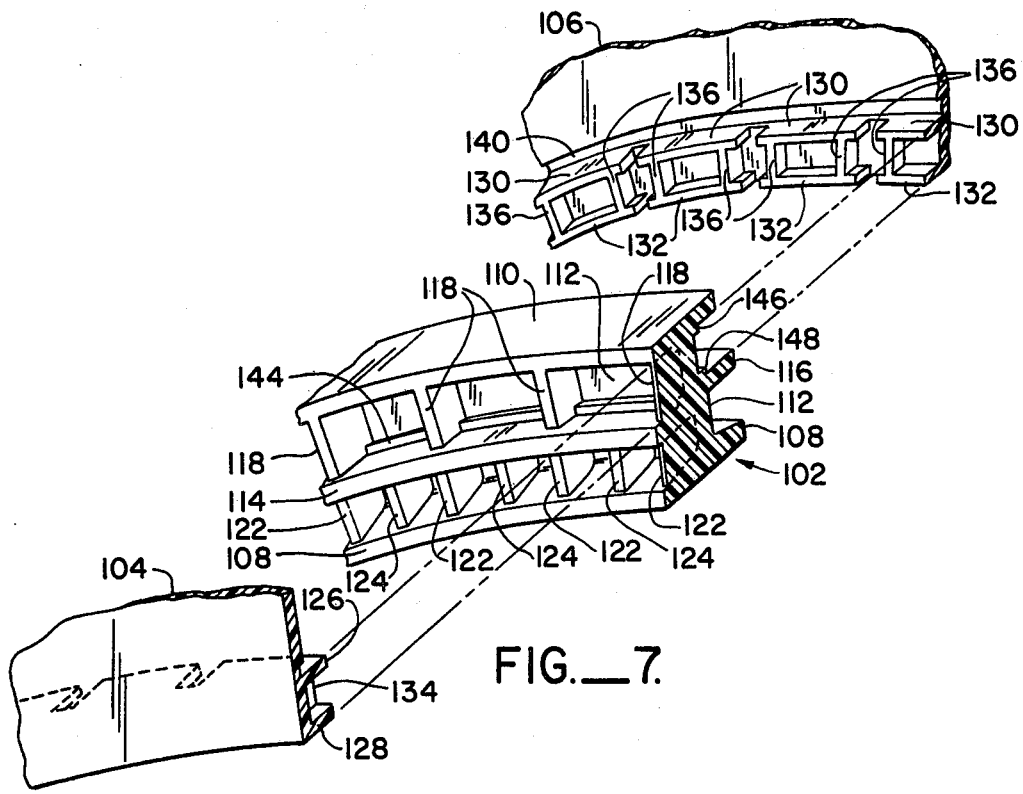
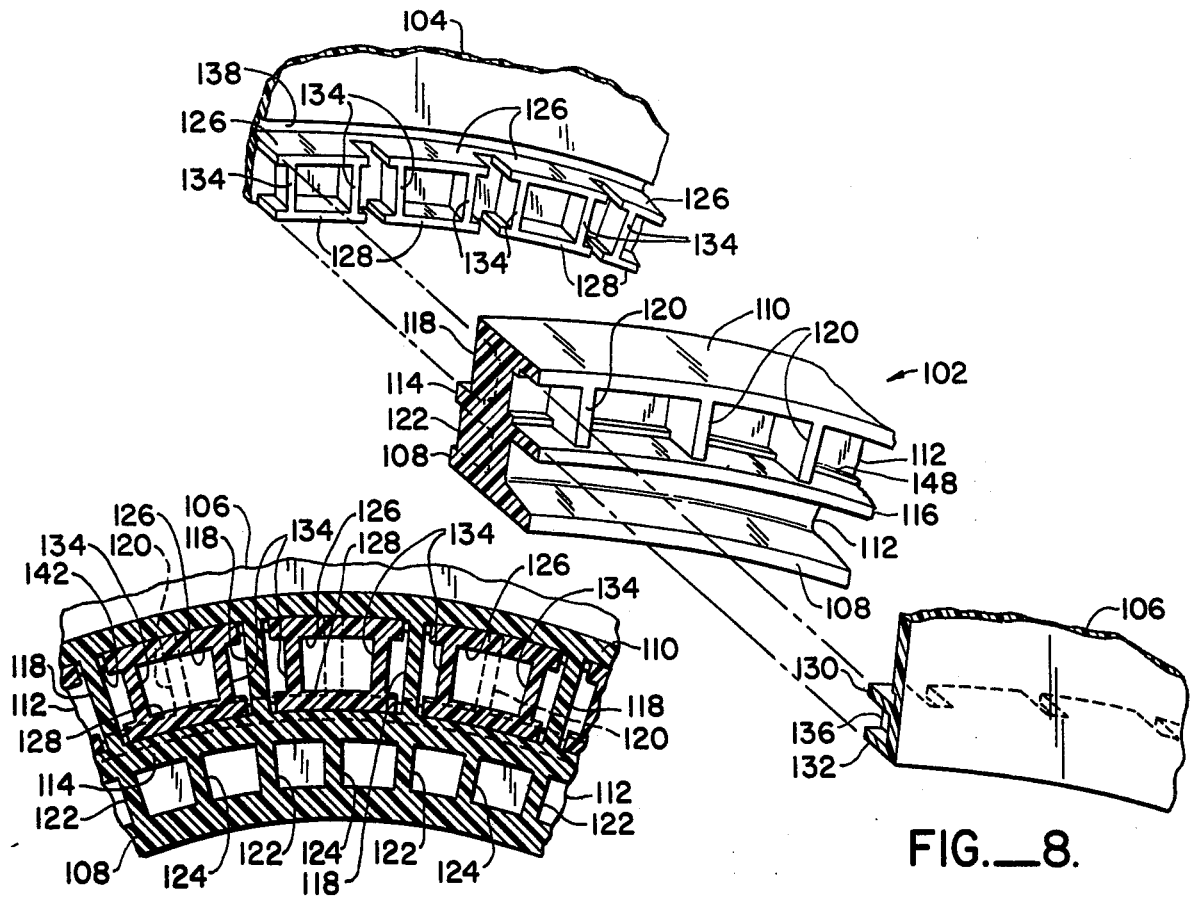
FIG.—7.
FIG.—8.
FIG.—9.

REEL FOR MAGNETIC RECORDING TAPE

BACKGROUND OF THE INVENTION

This invention relates to a tape reel, and particularly to a reel for storing magnetic tape such as is used with computers.

Magnetic tape reels in the prior art have generally comprised either a metallic hub with spaced flanges of metal or plastic attached thereto, or an all-plastic reel having both a plastic hub and plastic flanges attached thereto.

Prior art metallic reels have suffered several disadvantages, the principal one being the high cost of manufacture, both in the material and labor costs. Additionally, the metal hubs, such as used on the reel of Perlini U.S. Pat. No. 3,088,689, have a substantially different coefficient of thermal expansion from that of the tape and may cause stretching of the tape if the tape and reel are exposed to low temperatures.

Such high costs of manufacture have been overcome to a large extent by the use of synthetic resins or plastics for both the reel hub and its flanges. However, most of the prior art plastic reels have suffered numerous problems of their own. The primary problem of plastic reels has related to the inability of the plastic hub to withstand the compressive forces imparted to the hub by the wound tape. More particularly, the problem has come from the inability of the rim upon which the tape is wound to withstand these compressive forces. One new type of reel addressing this problem has been made the subject of a patent application on a reel for magnetic recording tape, Ser. No. 728,503, now abandoned, in the name of Anil Vasudeva and Don W. Geri, and assigned to the assignee of the present application. However, it is believed that even the reel of that prior application may experience some difficulties in the manufacturing process.

SUMMARY OF THE INVENTION

In view of the problems of the prior art reels it is an object of this invention to provide a tape reel which resists compressive deformation of the surface upon which the tape is wound. More particularly, it is an object of this invention to provide such a reel in which the flange structure provides additional support against any such compressive deformation of the tape supporting surface.

To achieve these objects and others, a tape reel is described which includes a hub and a pair of opposed flanges attached to and extending radially outward from the hub. The hub further includes axially extending coaxial inner and outer rims joined by a radially extending web and a coaxial intermediate ring on each side of the web extending axially outward therefrom. The flanges are received on opposite sides of the hub, and each has a pair of coaxial rings extending axially inward of the reel with the radially outer flange ring on each flange being received against the corresponding radially inward portion of the hub outer rim. The radially inner flange ring on each flange is similarly received against the radially outward portion of the corresponding hub intermediate ring. The structure of the hub and the mating relationship between the hub and the opposing flanges strengthens the hub and supports its outer rim against compressive deformation by forces exerted by the tape wound thereupon. In a preferred embodiment the reel of this invention is formed entirely of a rigid synthetic resin, or plastic.

BRIEF DESCRIPTION OF THE DRAWINGS

FIG. 1 is a perspective view, partially in section, of the reel of this invention, illustrating the side of the reel which will be facing outward when the reel is mounted on a tape drive;

FIG. 2 is a fragmentary perspective view, partially in section, of the reel of FIG. 1, illustrating the opposite, inward facing side thereof;

FIG. 3A is a fragmentary, exploded sectional view of a portion of the hub and one flange of the reel of this invention;

FIG. 3B is a fragmentary sectional view of a portion of the assembled hub and flanges of the reel of this invention;

FIG. 4 is an exploded view of a fragment of the reel of this invention, viewed from the outward facing side thereof;

FIG. 5 is an exploded view of the same reel fragment as FIG. 4, illustrating the inward facing side thereof;

FIG. 6 is a fragmentary sectional view of the reel of this invention, taken along line 6—6 of FIG. 3;

FIG. 7 is an exploded view of the fragment of an alternative embodiment of the reel of this invention, viewed from the outward facing side thereof;

FIG. 8 is an exploded view of the reel fragment of FIG. 7, illustrating the inward facing side thereof; and FIG. 9 is a fragmentary sectional view of an alternative embodiment of the reel of this invention, taken along line 9—9 of FIG. 3.

DESCRIPTION OF A PREFERRED EMBODIMENT

Two particularly preferred embodiments of the reel of this invention are illustrated in the drawings, with the embodiment of FIGS. 7 through 9 representing only a minor variation on that of FIGS. 4 through 6. The embodiment of FIGS. 4 through 6 will be used for the initial detailed description, with the variations incorporated in FIGS. 7 through 9 described subsequently; FIGS. 1, 2, 3A and 3B apply equally to both embodiments.

The reel of this invention comprises three basic components, the hub 2, a front or first flange 4 and a rear or second flange 6. Suitably, both flanges 4 and 6 may be molded of a synthetic resin, such as styrene. For additional strength, it is desirable that the hub 2 be molded of a higher strength material than the flanges, suitably a filled synthetic resin such as glass-filled styrene or glass-filled styrene-acrylonitrile, commonly referred to as SAN. This higher strength hub material assists in resisting the radially inward forces exerted by tape wound upon the hub.

The manner of construction and the detailed configuration of the reel components are illustrated in the enlarged sectional view of FIG. 3B. In this view, it may be seen that the hub 2 comprises an inner rim 8, which may engage a tape drive spindle, and an outer rim 10, upon which the tape is wound, joined together by a web 12 which extends radially between the two rims. Projecting axially from opposite sides of the web 12 are first side intermediate ring 14 and second side intermediate ring 16, which are coaxial with the rims 8 and 10 and thus with the reel itself. Extending radially outer rim 10 and intermediate rings 14 and 16 are a plurality of hub outer ribs 18 and 20, also illustrated in FIGS. 4 through 6. By the use of this ribbed construction instead of heavy solid sections for the hub, the outer rim section 10 of the hub may be kept thin enough in section to avoid any sinking or distortion problems normally encountered with thick sections. Further to avoid thick sections, it may be noted in FIGS. 4 and 5 that the ribs 18 and 20 are angularly positioned in a staggered arrangement, and hub intermediate rings 14 and 16 are radially offset from one another, so that no thick sections of the hub other than rims 8 and 10 directly oppose one another. On the first side (the front or outside of the reel when mounted on a tape drive) it may be noted that the hub outer ribs 18 are aligned with hub inner ribs 22 which extend radially between the intermediate ring 14 and the inner rim 8. Additionally, on the first side of the hub a plurality of auxiliary inner ribs 24 also extend radially between the first side intermediate ring 14 and the inner rim 8. These auxiliary inner ribs 24 are positioned such that one such rib 24 is located between each adjacent pair of hub inner ribs 22. By this ribbed construction radially compressive forces acting upon outer rim 10 may be transmitted directly to the intermediate rings 14 and 16 support, and any such loads on first side intermediate ring 14 may be transmitted directly to the inner rim 8 for additional support. Due to the industry standard requirement that a recording lockout groove be provided on the side of the reel facing the tape drive, no inner hub ribs corresponding to first side inner ribs 22 and 24 extend between second side intermediate ring 16 and the inner rim 8.

The opposed flanges 4 and 6 are best illustrated with reference to FIGS. 3A through 5. These flanges are generally annular, disc-like members attached to the hub 2. Each flange has a pair of coaxial rings extending axially inward of the reel. On the front, or first, flange 4 the radially outer and inner such rings are denoted respectively by reference numbers 26 and 28; on rear, or second, flange 6 the corresponding rings are denoted by reference numbers 30 and 32. First side flange rings 26 and 28 are received between the outer rim 8 and the intermediate ring 14. As illustrated in FIGS. 1 through 3B, the first side outer flange ring 26 engages the radially inward portion of the hub outer rim 10 and the first side inner flange ring engages the radially outward portion of intermediate ring 14, as will be described below with respect to the assembly of the reel. Also, the flange rings 26 and 28 are both slotted to straddle the first side outer hub ribs 18, in a manner illustrated in FIG. 6. In a similar manner, the second side outer flange ring 30 engages the second side radially inward portion of the hub outer rim 10, and the second side inner flange ring 32 engages the radially outward portion of the intermediate ring 16. The second side flange rings 30 and 32 likewise are slotted to straddle the second side hub outer ribs 20. In this first preferred embodiment alternate slots in the respective flange rings are only slightly wider than the thickness of the hub outer ribs 18 and 20 which they straddle, such that the close spacing between the slot surfaces and the respective straddled ribs may serve to position the flanges angularly with respect to the hub. Conversely, the alternate slots intermediate those which are closely spaced from the straddled hub rib are made substantially wider than the straddled hub outer ribs, as illustrated in FIG. 6. These alternate wider slots thus provide substantially no restraint upon the angular positioning of the flanges with respect to the hub and assist in avoiding interference between the flange slots and the hub ribs, such as might occur due to tolerance build-up in the molding process. It may be noted from the drawing that the adjacent flange ribs between each pair of circumferentially adjacent hub outer ribs are spaced circumferentially closer together than the adjacent pairs of hub outer ribs so that the adjacent pairs of flange ribs are circumferentially spaced from their respectively adjacent hub outer ribs.

To strengthen the flange rings against deflection or deformation by any radial force acting thereupon, the first flange is provided with a plurality of flange ribs 34 extending radially between the first side outer flange ring 26 and first side inner flange ring 28. Similarly, the second flange 6 is provided with a plurality of flange ribs 36 extending radially between flange rings 30 and 32. By the provision of these radially extending ribs 34 and 36 any radially deforming forces exerted upon the outer flange rings 26 and 30 may be transmitted directly to the respective inner flange rings 28 and 32, and then borne by the engagement of those inner flange rings with the respective hub intermediate rings 14 and 16. Thus, this flange ring and rib structure provides substantial additional support for hub outer rim 10 against the radially compressive forces exerted by tape wound thereupon. While any convenient number of flange ribs 34 and 36 may be provided, it is preferred to have at least one and preferably two between each pair of hub rib straddling slots, as illustrated in FIGS. 4–6. By providing two such flange ribs 34 and 36 between each pair of hub rib straddling slots, the combination of the two flange ribs and the portions of the inner and outer flange rings which they engage (and with which they preferably are molded) form a box section for transfer of any radially compressive loads between the inner and outer flange rings, so that both such flange rings may serve to support one another.

To provide additional support for the hub outer rim 10 against radial deflection, the respective flanges 4 and 6 are each provided with a circular groove, 38 and 40, respectively. These grooves 38 and 40 are approximately the same width as the thickness of outer rim 10 and are located on the axially inner surface of the flange immediately radially outward of the respective outer flange rings 26 and 30. As illustrated in FIG. 3B, the axially outer edge of hub outer rim 10 is received into these grooves 38 and 40 when the flanges 4 and 6 are assembled onto the hub.

While any suitable method, such as adhesive bonding or staking, may be used for attaching the flanges 4 and 6 to the hub 2, it is preferred to attach the flanges to the hub by means of ultrasonic weldments. It is further preferable that these weldments comprise the areas of contact of the flanges 4 and 6 with the respective axial extremities of the hub outer ribs 18 and 20, and also those areas of engagement between the axially innermost portions of the flange rings 26, 28, 30, and 32 with the hub, as illustrated in FIG. 3B. To provide for the weldments between the first flange rings 26 and 28 and the hub, annular ultrasonic energy concentrators 42 and 44 are provided respectively on the radially inward portion of hub outer rim 10 and the radially outward portion of hub intermediate ring 14, both adjacent the radially extending web 12. Similarly, to provide for the weldments between the second flange rings 30 and 32 and the hub, annular ultrasonic energy concentrators 46 and 48 are provided on the hub second side, extending respectively from the radially inward portion of hub outer rim 10 and the radially outward portion of hub intermediate ring 16, both energy concentrators also being adjacent the hub web 12. Prior to assembly and such ultrasonic welding, the axially innermost portions of the flange rings 26, 28, 30, and 32 are generally squared off, as indicated in FIG. 3A. However, during the ultrasonic welding process these squared off portions are melted slightly to form a bond between the flange rings 26, 28, 30, and 32 and the corresponding energy concentrators 42, 44, 46, and 48, as illustrated in FIG. 3B. Also during the welding process, as the flanges 4 and 6 are pressed inwardly into engagement with the hub 2, the axially outermost portions of hub outer ribs 18 and 20 come into engagement with portions of the axially entered surfaces 50 and 52 of the flanges 4 and 6. To provide a still stronger bond between the hub 2 and the flanges 4 and 6, the flanges continue to be urged inwardly during the application of ultrasonic energy to the assembly even after the axially outermost portions of the ribs 18 and 20 contact the inner surface 50 of the flanges. Thus, these radially extending hub outer ribs 18 and 20 are forced into the flanges 4 and 6, respectively, to form additional radially extending weldments between the hub and the flanges. The welding process, with the flanges being urged axially inwardly, is terminated when the flanges 4 and 6 are spaced predetermined distances from the axial center of the hub. Preferably the circular flange slots 38 and 40 are dimensioned to provide a slight clearance for reception of hub outer rim 10 without the development of undesirable stresses.

From the above described manner of construction and assembly it may be seen that, upon assembly and welding of the flanges 4 and 6 to the hub 2, the engagement of the hub outer rim 10 with the slots 38 and 40 of the flange and the engagement between the flange rings 26, 28, 30, and 32 with the hub rim 10 and intermediate rings 14 and 16, provide the hub, and particularly the outer rim 10, with additional support against compressive deformation. By virtue of this construction any radially compressive deformation of the hub outer rim 10 would require a corresponding deformation of the immediately adjacent flange rings 26 and 30. These flange rings 28 and 30 are supported against radially compressive deformation by the flange ribs 34 and 36 which transfer the load to inner flange rings 28 and 32 and thence to hub intermediate rings 14 and 16. Thus, any radially compresive load exerted on the hub outer rim 10 is directly distributed to the flanges and flange rings and also to the hub intermediate rings for support.

The alternative preferred embodiment of this invention is illustrated in FIGS. 7 through 9 and is substantially similar so that of the embodiment described above. In view of this similarity, like elements on this second embodiment are provided with designation numbers corresponding to those of the first embodiment but increased by 100, i.e., hub 102 on the second embodiment corresponds to hub 2 of the first. The principal difference between this second embodiment and the first is that all of the flange ring slots for straddling the hub outer ribs 118 are formed of generally equal width, each such slot being only slightly wider than the thickness of the hub rib it straddles. Thus, with this embodiment there is generally equal space between each of the hub ribs 118 and the edges of the hub ring slots. While this second embodiment provides for potentially closer alignment between the flanges and the hub, it also suffers the disadvantage that a build-up of tolerances could result in an interference between some of the hub ribs 18 and their corresponding straddling flange ring slots, thus potentially making assembly slightly less convenient.

While the foregoing describes two particularly preferred embodiments of the reel of this invention, it is to be recognized that numerous other embodiments employing the principles of this invention will readily become apparent to those skilled in the art. Accordingly, the foregoing description is intended to be illustrative only of those principles of the invention and not to be limitative thereof. The scope of this invention is thus to be limited not by the foregoing descriptions but solely by the claims appended hereto.

What is claimed is:

1. A reel for magnetic recording tape, comprising a hub including axially extending coaxial inner and outer rims joined by a radially extending web, and a coaxial intermediate ring on each side of said web extending axially outward of said web;

a pair of opposed flanges attached to and extending radially outward of said hub with a first said flange received on a first axial side of said hub and a second said flange received on the second, opposed axial side of said hub, each flange having a pair of coaxial rings extending axially inward of said flange with the radially outer said flange ring on each said flange being received against the corresponding radially inward portion of said outer rim, and the radially inner said flange ring on each said flange being received against the radially outward portion of the corresponding said intermediate ring, whereby the flanges and their flange rings may serve both to support the hub outer rim against radially inward deflection and also to carry a portion of any radially inward deforming forces on the hub outer rim to the hub intermediate rings for support.

2. A reel according to claim 1 wherein said hub and both said flanges are formed of a rigid synthetic resin.

3. A reel according to claim 2 wherein said flanges are attached to said hub by weldments.

4. A reel according to claim 3 wherein said weldments are located at least between said hub outer rim and said flange outer rings and between said hub intermediate rings and said flange inner rings.

5. A reel according to claim 1 further comprising a plurality of hub outer ribs extending radially between said hub outer rim and said hub intermediate rings on both sides of said hub, whereby the hub outer ribs may serve to carry a portion of any radially deforming forces on the hub outer rim to the hub intermediate rings for support.

6. A reel according to claim 5 further comprising a plurality of flange ribs extending radially between said inner flange ring and said outer flange ring on each said flange, whereby a portion of any radially deforming force acting on one of the flange rings may be carried by the ribs to the other flange ring joined thereto.

7. A reel according to claim 6 wherein both said outer flange ring and said inner flange ring on each said flange are provided with slots dimensioned and located to straddle said hub outer ribs, and wherein a plurality of flange ribs are provided extending generally radially between said inner and outer flange rings with at least one said flange rib located between circumferentially adjacent pairs of said flange ring slots, whereby the flange ribs may serve to transfer at least a portion of any radially compressive loads from the flange outer ring to the flange inner ring for support.

8. A reel according to claim 6 wherein at least two said flange ribs are provided between circumferentially adjacent pairs of said flange ring slots, whereby adjacent pairs of flange ribs and the portions of the inner and outer flange rings extending between them may form box sections to strengthen the flange rings against radial deformation.

9. A reel according to claim 8 wherein each said flange is attached to said hub by bonding its respective outer flange ring to the radially inner portion of said hub outer rim and bonding said flange inner ring to said corresponding intermediate ring radially outward portion, whereby the combination of the bonds, flange rings and flange ribs serve to form box sections to strengthen the hub against radially compressive deformation.

10. A reel according to claim 8 wherein said adjacent said flange ribs located between circumferentially adjacent said hub outer ribs are spaced circumferentially closer together than said adjacent pairs of hub outer ribs such that said adjacent pairs of flange ribs are circumferentially spaced from their respectively adjacent hub outer ribs.

11. A reel according to claim 8 wherein at least circumferentially alternate said flange slots are formed substantially wider than said straddled hub outer ribs, whereby the edges of said wider alternate slots are spaced from the sides of the hub outer ribs which they straddle.

12. A reel according to claim 7 wherein each said hub outer rib is substantially equal in width and each said flange ring slot is substantially equal in width, whereby the clearance between the edges of each said slot and its respectively straddled hub outer rib is generally equal to that for every other flange ring slot and its respectively straddled hub outer rib.

13. A reel according to claim 5 wherein said flanges are attached to said hub by weldments between (a) said hub outer rim and said flange outer rings, (b) said hub intermediate rings and said flange inner rings and (c) said hub outer ribs and portions of the respectively adjacent flanges.

* * * * *